(12) United States Patent
Kmita et al.

(10) Patent No.: US 6,467,663 B1
(45) Date of Patent: Oct. 22, 2002

(54) CARGO SUPPORTING APPARATUS FOR USE WITH A BED OF A PICKUP TRUCK

(75) Inventors: Gerard J. Kmita, Allen Park; Brett J. Borella, Bloomfield Hills; Jeffrey M. Aftanas, Ortonville, all of MI (US)

(73) Assignee: JAC Products, Inc., Saline, MI (US)

( * ) Notice: Subject to any disclaimer, the term of this patent is extended or adjusted under 35 U.S.C. 154(b) by 12 days.

(21) Appl. No.: 09/698,755

(22) Filed: Oct. 27, 2000

(51) Int. Cl.⁷ ................................................. B60R 9/00
(52) U.S. Cl. ...................... 224/404; 224/403; 224/497; 224/498; 224/282; 248/99; 383/33
(58) Field of Search ................................. 224/282, 403, 224/404, 497, 498; 248/99; 383/33

(56) References Cited

U.S. PATENT DOCUMENTS

| | | | |
|---|---|---|---|
| 1,548,986 A | * | 8/1925 | Donovan |
| 2,079,592 A | * | 5/1937 | Battin |
| 2,213,930 A | * | 9/1940 | Hoffman |
| 2,965,344 A | * | 12/1960 | Baker |
| 3,716,938 A | * | 2/1973 | Ammons |
| 3,991,961 A | * | 11/1976 | Platzer, Jr. |
| 4,955,771 A | | 9/1990 | Bott |
| 5,094,375 A | * | 3/1992 | Wright |
| 5,098,108 A | * | 3/1992 | McKinney |
| 5,340,004 A | * | 8/1994 | Moore |
| 6,068,221 A | * | 5/2000 | Rosen ........................ 248/99 |
| 6,170,724 B1 | * | 1/2001 | Carter et al. ................ 224/404 |

FOREIGN PATENT DOCUMENTS

WO 97/29017 * 8/1997

* cited by examiner

*Primary Examiner*—Gregory M. Vidovich
(74) *Attorney, Agent, or Firm*—Harness, Dickey & Pierce, PLC (57) ABSTRACT

A cargo supporting apparatus adapted to be used within a bed of a pickup truck. The apparatus includes a frame which is pivotally mounted to a longitudinal sidewall of the bed such that it can be moved between a stowed position and an operative position. In the operative position the frame extends generally horizontally from the sidewall of the bed. A pivot assembly is used to support the frame in its operative position. A locking assembly is operatively associated with the pivot assembly for holding the frame in its operative position. The locking assembly also includes a user actuatable lever. The actuatable lever can be used to unlock the locking mechanism such that the frame can be pivoted from its operative position into its stowed position. The frame includes a plurality of openings which each have a cargo carrying element such as a net or flexible bag. Articles such as grocery bags or other small items of cargo can be placed in the net or bag such that they will be held stationary while the vehicle is in use.

14 Claims, 8 Drawing Sheets

CARGO SUPPORTING APPARATUS FOR USE WITH A BED OF A PICKUP TRUCK

TECHNICAL FIELD

This invention relates to cargo carrying systems for motor vehicles, and particularly to a cargo carrying system for a pickup truck which allows cargo to be securely transported in a bed of the pickup truck, and which can be folded into a stowed position to allow unimpeded use of the bed.

BACKGROUND OF THE INVENTION

A variety of cargo carrying devices have been developed for use with the interior areas of motor vehicles such as sport utility vehicles, station wagons and pickup trucks. With specific regard to pickup trucks, such cargo supporting systems have typically involved the use of one or more elongated panels which can be positioned by a user within the bed of the vehicle. One such system is disclosed in U.S. Pat. No. 4,955,771, assigned to the assignee of the present application. This type of system, while effective for restraining items of widely varying sizes and shapes, can nevertheless impede the use of a major portion of the bed area when being used to support smaller items such as grocery bags. Such systems often also require the user to drop the tailgate of the pickup truck before being able to position the beam-like member used to divide the interior area of the truck bed, and sometimes require the user to climb into the bed to position/install the beam-like member.

In view of the foregoing, it would be highly desirable to provide some form of cargo carrying device that is specifically adapted to be used within cargo carrying areas of motor vehicles such as pickup trucks, sport utility vehicles and station wagons, which can be placed in a stowed position when not in use and easily urged into an operative position when the need arises to transport smaller packages or articles. It would further be highly desirable if such a system allowed a user to place the cargo carrying device in its operative position without having to lower the tailgate of a pickup truck or otherwise climb into the cargo carrying area of the vehicle and manipulate large beam-like space dividing members.

It would further be desirable to provide a cargo carrying device which can be used with pickup trucks, station wagons and sport utility vehicles, and which does not occupy considerable space when not in use. Such a device would allow a major portion of the cargo carrying area to be used to hold larger items of cargo without interference from the cargo carrying device.

SUMMARY OF THE INVENTION

The above and other objects are provided by a cargo carrying apparatus in accordance with preferred embodiments of the present invention. In one preferred embodiment the apparatus includes a frame having at least one opening. The frame is supported by at least one pivot assembly along a wall portion of a cargo carrying area, such as, for example, a cargo bed of a pickup truck or an interior wall of a cargo area of a sport utility vehicle. A locking mechanism is operably associated with the pivot assembly and includes a user actuatable member for disengaging the locking system. A cargo carrying element such as a net or flexible bag is secured to the opening, with the opening supporting the net or bag at its upper edge.

The frame can be disposed in a stowed position in which it is compactly positioned along the wall portion of the vehicle from which it is pivotally supported. In the stowed position the frame takes up only a very small percentage of the cargo area of the vehicle (e.g., the bed of a pickup truck). Thus, a major portion of the bed can be used to hold larger items of cargo when the apparatus is not in use.

When the need exists to support one or more smaller items of cargo, such as one or more bags of groceries, the frame can be lifted into its operative position, whereupon the pivot assembly automatically locks the frame in this position. The smaller articles can then be placed in the cargo carrying bag or net. Where the apparatus is disposed within a bed of a pickup truck, the smaller articles can be placed within the cargo carrying bag or net without the user having to climb into the bed to load the items.

After the cargo items have been removed from the cargo carrying bag or net, the actuatable member can be articulated to unlock the locking mechanism. This allows the frame to pivot into the stowed position for storage. Movement of the frame member from its operative position to its stowed position is accomplished quickly and easily.

In one preferred embodiment the frame is comprised of a single piece of high strength plastic. The frame is sufficiently light in weight so that it can be lifted with a single hand into its operative position, whereupon the locking mechanism automatically locks it in this position. The frame preferably comprises a plurality of openings which each have a cargo net or bag associated therewith for carrying a plurality of articles. The apparatus can be installed with no modification to the bed of a pickup truck.

BRIEF DESCRIPTION OF THE DRAWINGS

The various advantages of the present invention will become apparent to one skilled in the art by reading the following specification and subjoined claims and by referencing the following drawings in which:

FIG. 5 is a perspective view of just the actuating assembly of the present invention;

DETAILED DESCRIPTION OF THE PREFERRED EMBODIMENTS

Figure 1:
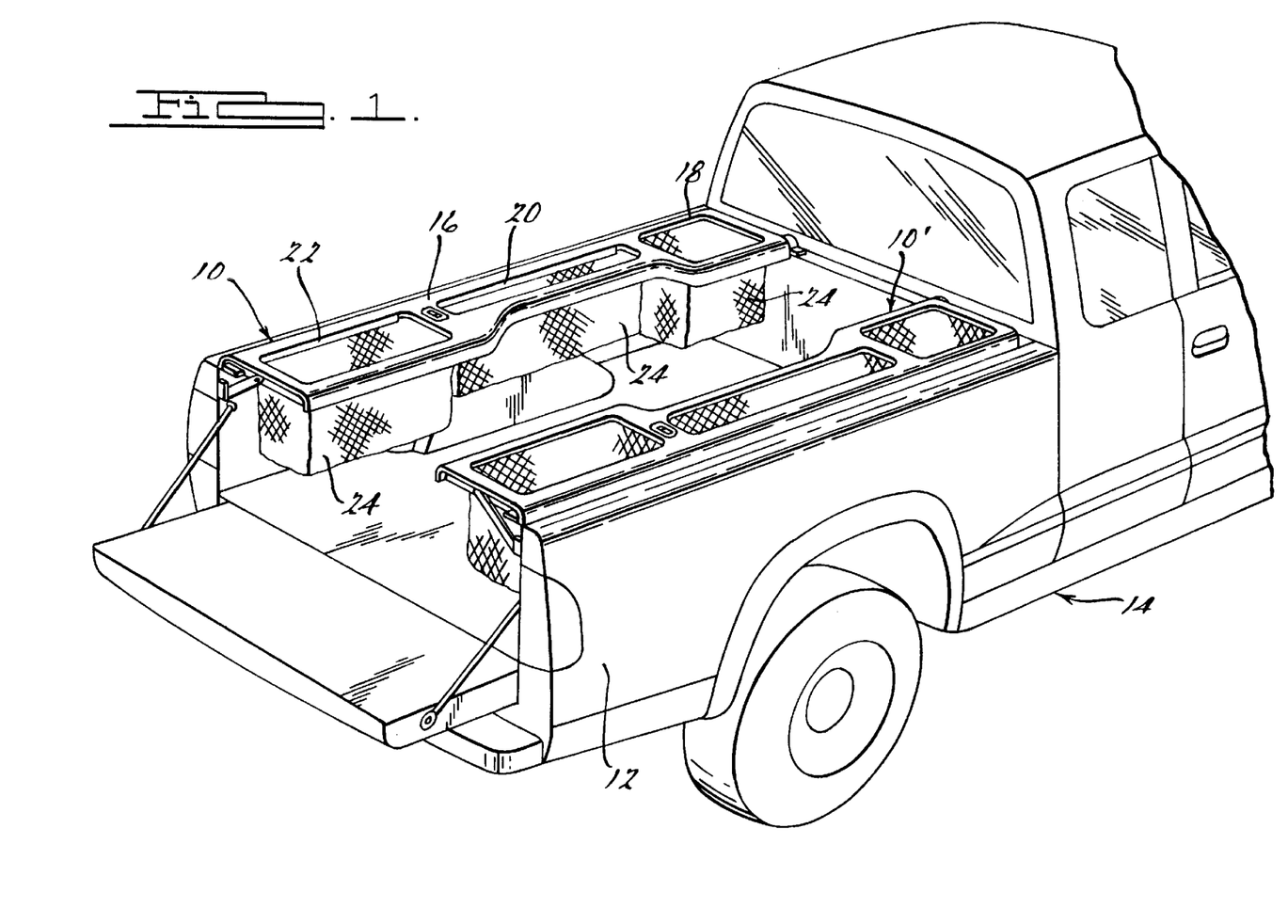
FIG. 1 is a perspective view of a pickup truck having a pair of cargo carrying apparatus in accordance with a preferred embodiment of the present invention installed in a cargo bed of the vehicle.

Referring to FIG. 1, there is shown a pair of identical cargo supporting apparatus 10 and 10' in accordance with a preferred embodiment of the present invention. The cargo carrying apparatuses 10,10' are disposed within a bed 12 of a pickup truck 14. It will be appreciated immediately, however, that the present invention is equally well suited for use with only minor modifications within a cargo carrying area of a sport utility vehicle or station wagon, or even within a trunk of sedan. Thus, the invention is not limited only to use with pickup trucks. It will also be appreciated that while a pair of apparatuses 10,10' are illustrated, that less than two of the apparatuses could be used to suit the needs of the vehicle owner. For the purpose of discussion, reference throughout the following description will be made to apparatus 10.

Apparatus 10 includes a rigid frame 16 which may be comprised of a single molded piece of lightweight but rigid plastic. The frame 16 is formed with a plurality of openings 18, 20 and 22. Each of these openings has an article supporting element 24 secured thereto so that the supporting elements 24 hang down from the frame 16 when the frame is in its operative position shown in FIG. 1. The article supporting elements 24 may be comprised of netting material or cloth such that the elements can be folded and/or collapsed when the frame 16 is folded down into its stowed position. Nylon is one material that is especially well suited for this purpose. However, any material capable of withstanding the elements could be used.

Each of the article supporting elements 24 are well adapted to receive and support grocery bags or other small or medium sized items that would typically require some support structure to keep them from moving and/or falling over within an area such as the bed 12. It will be appreciated that the frame 16 could be modified to include a greater or lesser number of openings than the three openings (i.e., 18, 20, and 22) shown in the preferred embodiment of FIG. 1. Also, one or more of the openings could incorporate a pivotally mounted cover.

A principal advantage of the apparatus 10 is that grocery bags or other items can be easily placed in the openings 18, 20,22 by an individual without the individual having to climb into the bed 12 of the vehicle 14. Another important advantage is that even when in use, the apparatus 10 permits a majority of the bed 12 to be used to transport other larger items of cargo. Obviously, however, if a pair of apparatuses 10,10' are used, then a smaller portion of the bed 12 will be available for transporting other larger cargo items.

Figure 2:
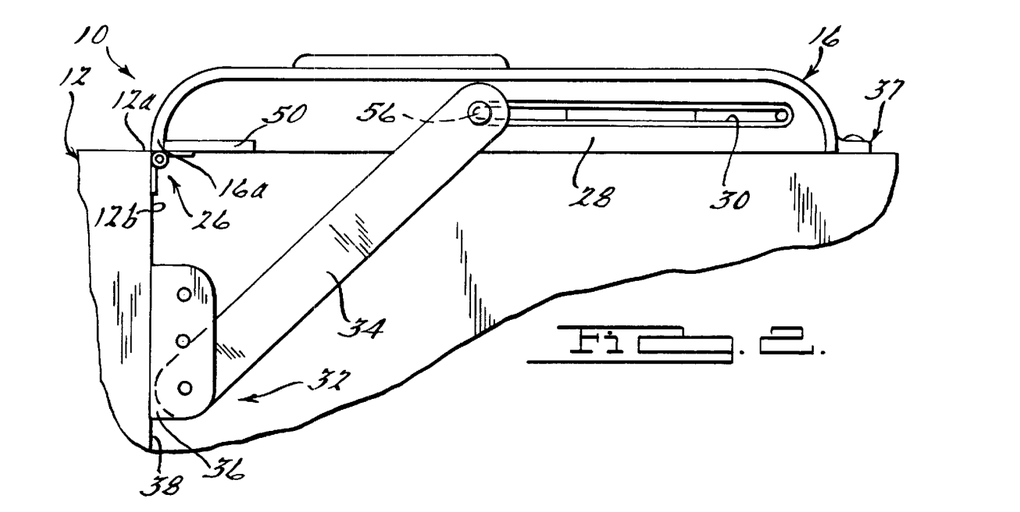
FIG. 2 is a end view of one of the cargo carrying apparatuses of FIG. 1 illustrating more clearly one of the plurality of pivot assemblies used to support the apparatus in its operative position.
Figure 3A:
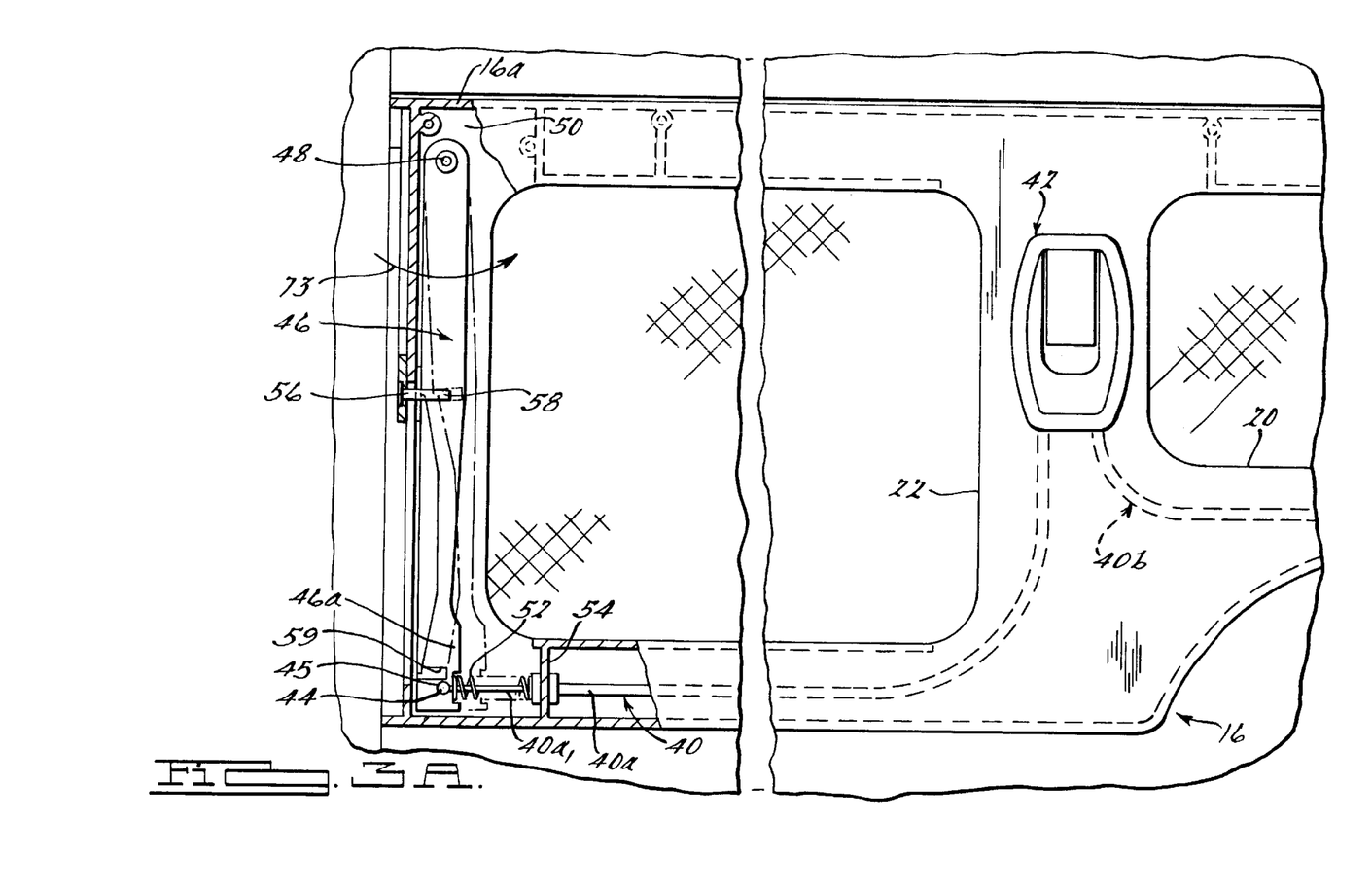
FIG. 3A is a plan view of the rearwardmost portion of the apparatus of FIG. 1.
Figure 3B:
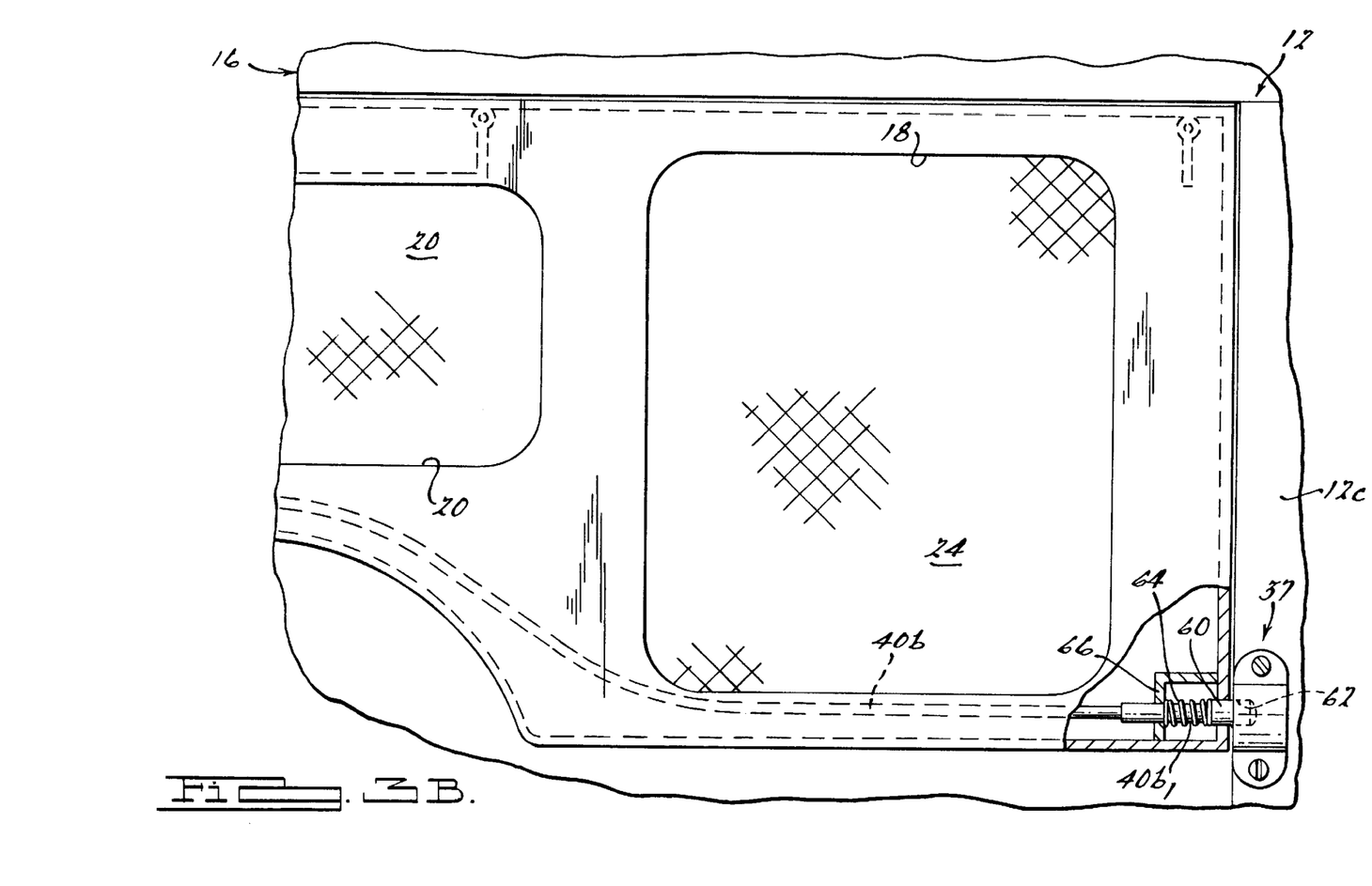
FIG. 3B is a plan view of the forwardmost portion of the apparatus of FIG. 1.
Figure 4:
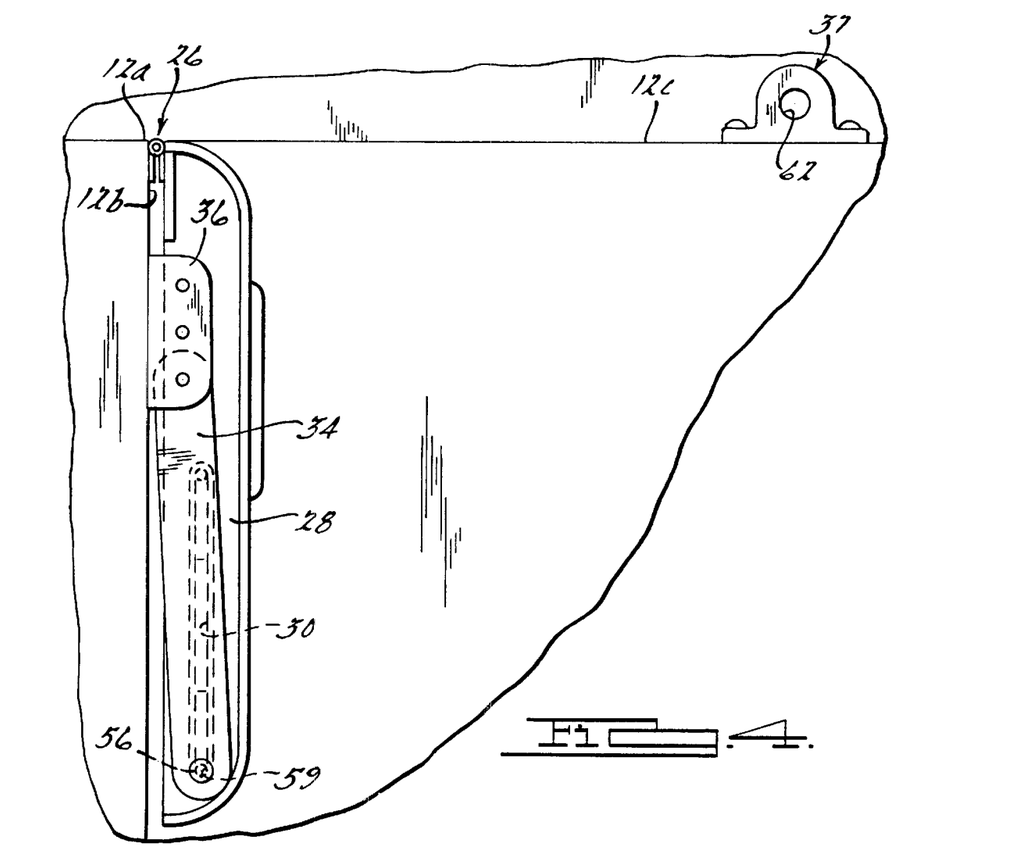
FIG. 4 is an end view of the apparatus of FIG. 2 in the stowed position.

Referring now to FIGS. 2 and 3A, the apparatus 10 is mounted via a plurality of longitudinally spaced apart hinges 26 to an inside upper edge 12a of an interior wall 12b of the bed 12. The frame 16 includes a first end plate 28 having an elongated slot 30. A pivot assembly 32 comprised of a pivot link 34 and a pivot bracket 36 supporting its associated pivot link 34 is used to support the frame 16 at one of its opposite longitudinal ends. One end of the pivot link 34 is pivotally secured to the pivot bracket 36, which is in turn fixedly secured to a lower inside portion 38 of a wall of the truck bed 12. Referring briefly to FIG. 3B, the opposite longitudinal end of the frame 16 is supported by an independent support member 37 secured on a horizontal shoulder portion 12c of the bed 12, which a portion of the frame 16, to be described momentarily, engages when the frame is urged into its operative position. The pivot assembly 32 allows the frame 16 to be moved between the operative position shown in FIG. 2 and the stowed position of FIG. 4. Advantageously, the frame 16 is supported closely adjacent the inside wall of the bed 12 when the apparatus 10 is in the stowed position to thus keep the great majority of the bed interior free for accommodating other articles.

With further reference to FIG. 3A, the apparatus also includes a locking assembly 40 which is operably associated with a user actuatable member 42. The locking assembly 40 comprises a pair of bowden cables 40a and 40b which have their inner cable members $40a_1$ and $40b_1$ (member $40b_1$ being shown in FIG. 3B) attached at first ends thereof to the actuation mechanism 42. The second end of cable member $40a_1$ has an enlarged spherical head 44 which is captured within a recess 45 formed in a locking arm 46. The locking arm 46 is mounted for pivotal movement at point 48 about a longitudinally extending support beam 50. The support beam 50 is fixedly secured to an undersurface of the frame 16 along longitudinal edge 16a of the frame. The locking arm 46 is biased into the position shown in FIG. 3A by a spring 52 captured between an end 46a of the locking arm and a wall portion 54 of the frame 16. When in the position shown in solid lines in FIG. 3A, a locking pin 56 engages a recess 58 within the locking arm 46 to hold the frame 16 in its operative position as shown in FIGS. 1 and 2. A recess 59 at an end of the locking arm 46 engages the locking pin when the frame 16 is moved into its stowed position shown in FIG. 4.

Referring to FIG. 3B, an opposite end of the frame 16, the inner cable $40b_1$ of bowden cable 40b is attached to a locking pin 60. The locking pin 60 engages a recess 62 in the independent support member 37 which is mounted to the inside wall 12b of the bed 12 when the frame 16 is in its stowed position. The locking pin 60 is biased by a spring 64 which is captured between a portion of the locking pin 60 and a wall portion 66 of the frame 16. Thus, the locking pin 60 is continuously biased into to the position shown in FIG. 3B.

Figure 6:
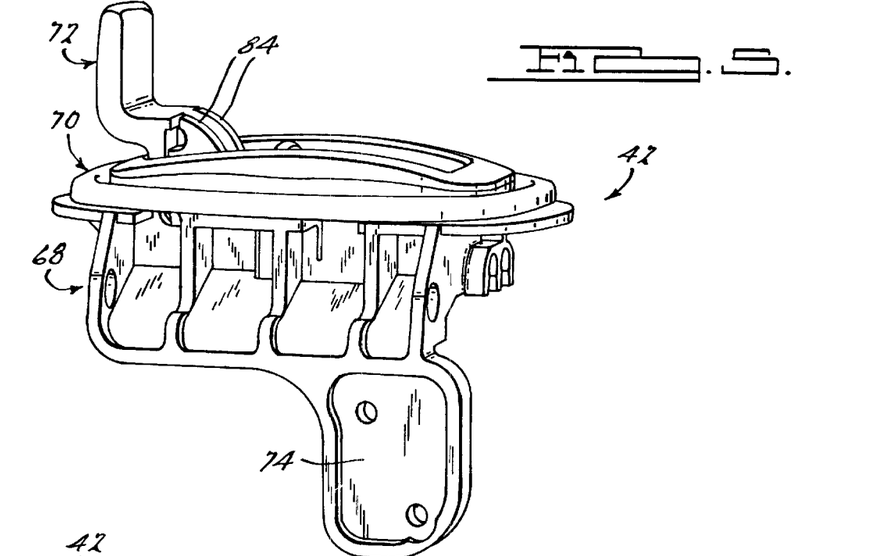
FIG. 6 is an exploded perspective view of the actuating assembly of FIG. 5.

With brief reference to FIGS. 1 and 5–9, the user actuator mechanism 42 is shown. Referring specifically to FIGS. 5 and 6, this mechanism includes a base portion 68, a cover 70 and a user actuatable lever 72. The base 68 includes a mounting portion 74 which may be secured via conventional threaded fastening elements or by any other suitable means to an undersurface of the frame 16. The frame includes an opening 16a (FIG. 4) which receives an upper edge portion 76 of the base portion 68 therethrough. The cover 70 is secured to the base portion 68 to help provide a decorative, aesthetically pleasing appearance to the mechanism 42. Securing is achieved by a pair of opposing resilient arms 68a (one being shown in FIG. 7) which engage with structure on a back surface of a pocket portion 70a of the cover 70 when the pocket portion is lowered into a recess 78 in the base portion 68.

Figure 7:
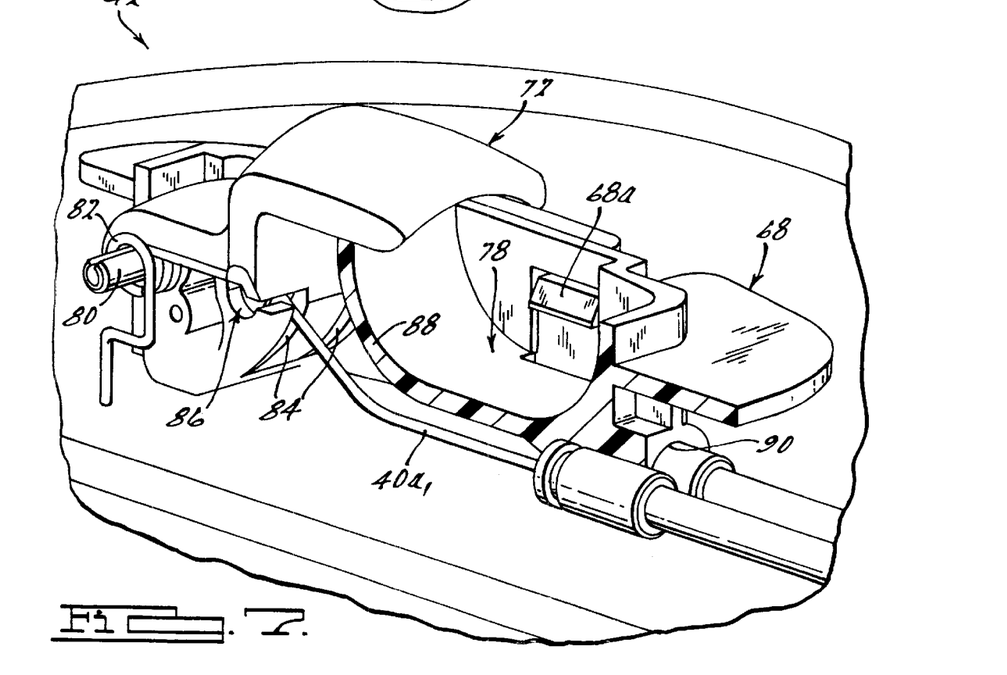
FIG. 7 is a partial cross sectional side view of the actuating assembly of FIG. 5.
Figure 8:
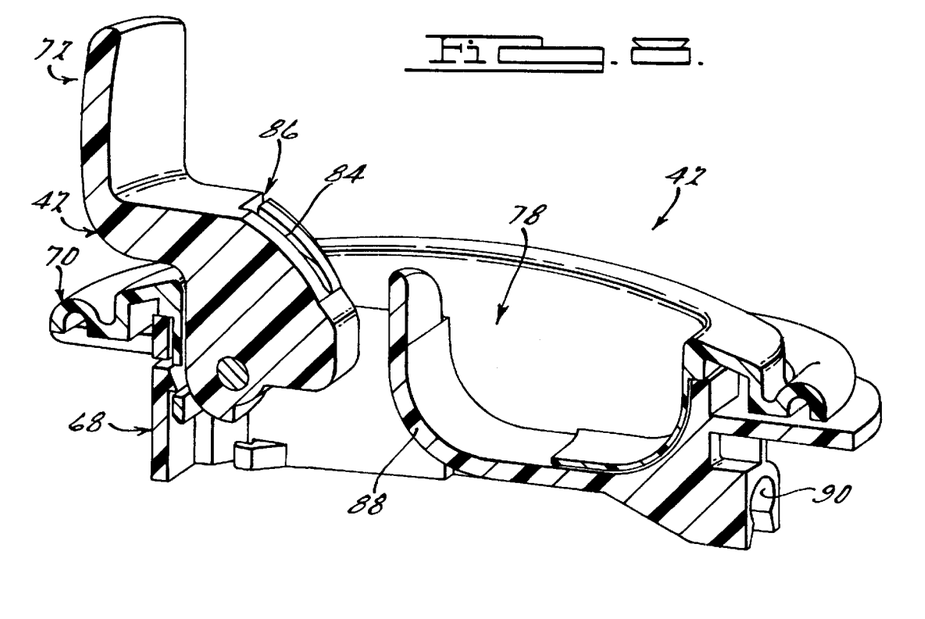
FIG. 8 is a partial cross sectional side view of the actuating assembly of FIG. 5 but without the bowden cables attached thereto.

With further reference to FIGS. 5–7, a portion of the lever 72 extends over the recess 78 when the mechanism 42 is fully assembled. The recess 78 allows one or two fingers of a users hand to be used to grasp the lever 72 and lift it. The lever 72 is pivotally mounted (FIG. 7) via a pin 80 supported within the base 68. A spring 82 provides a biasing force to maintain the lever in the orientation shown in FIG. 7 when it is not being actuated.

Figure 9:
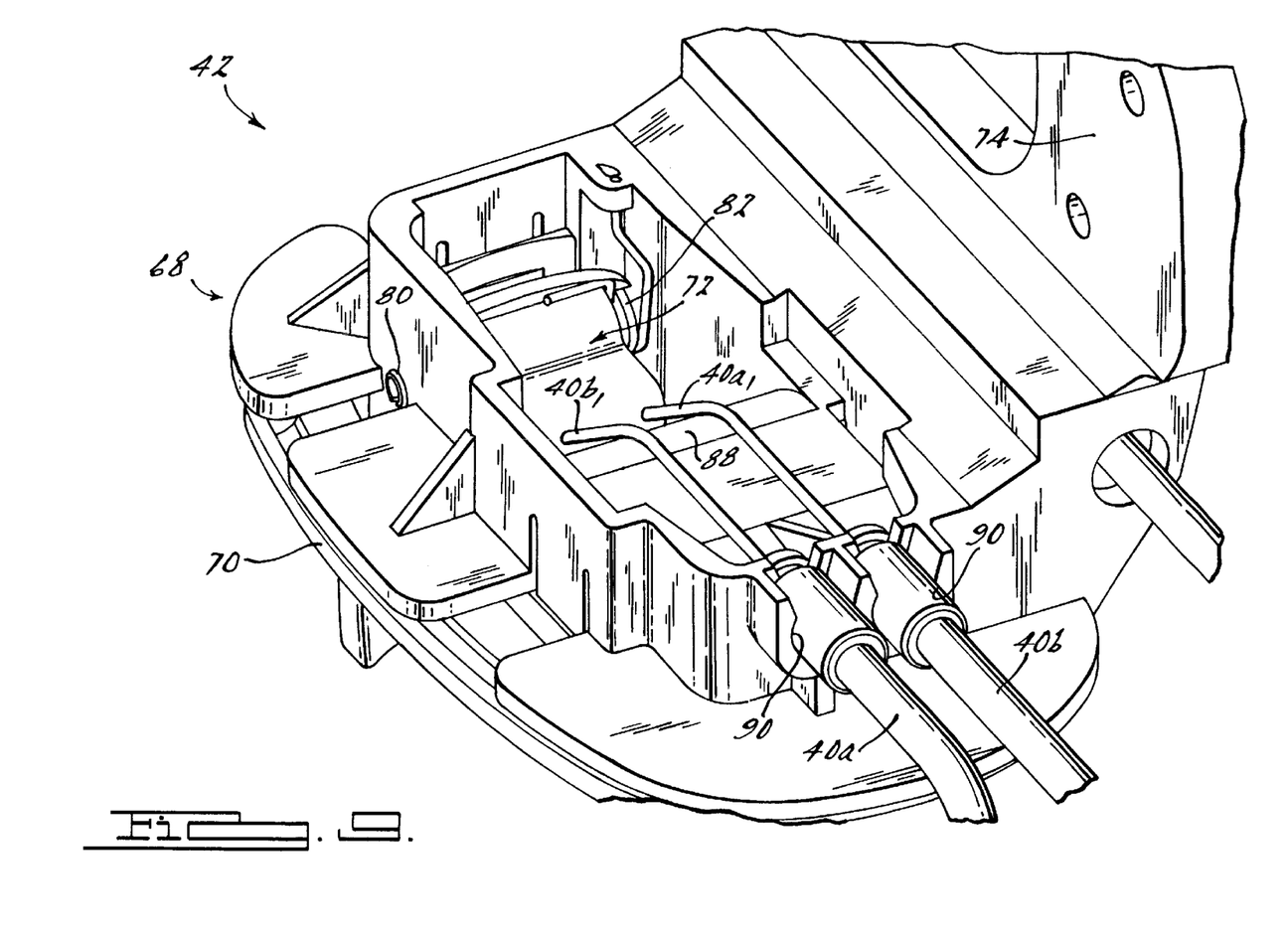
FIG. 9 is a perspective bottom view of a portion of the actuating assembly of FIG. 5.
Figure 10:
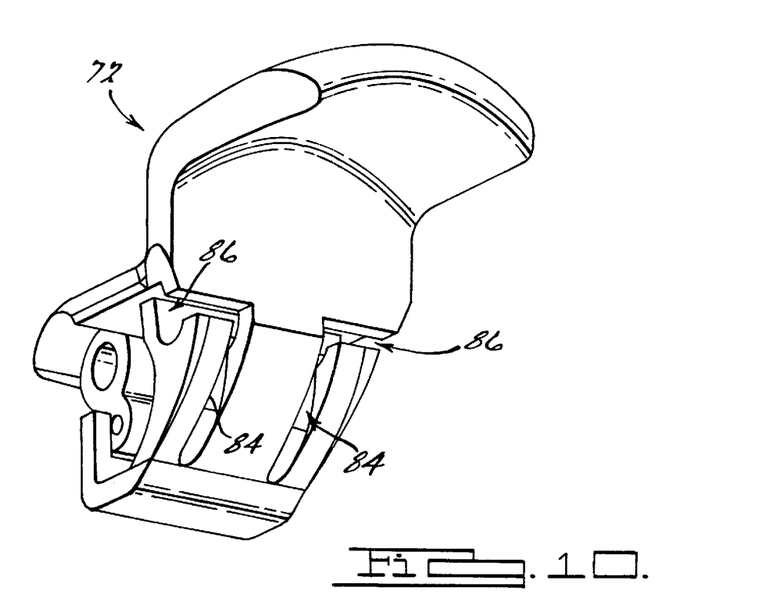
FIG. 10 is a perspective view of just the lever shown in FIG. 5.

The lever 72 is shown in greater detail in FIG. 10. The lever 72 includes a pair of slots 84 which each open into a respective recess 86. Each of the slots 84 and its associated recess 86 is used to retain an end of each bowden cable 40a and 40b. Referring to FIG. 7, the base portion 68 also includes a curving portion 88 to provide a surface against which portions of each of the inner cable members $40a_1$, $40b_1$ of each Bowden cable 40a, 40b may ride when the inner cable members are pulled by the lifting of the lever 72. Semicircular guide recesses 90 formed in the base portion 68 also help to maintain the ends of the bowden cables 40a, 40b longitudinally aligned with the slots 84. This feature is also shown in FIG. 9.

In operation, lifting the lever 72 causes the inner cable members 40a₁ and 40b₁ to be pulled, which in turn causes the locking pin 60 to be withdrawn from its independent support member 62 and the locking arm 46 to be simultaneously pivoted in the direction of arrow 73 in FIG. 3A. Movement of the locking arm 46 causes the locking pin 56 to be separated from the recess 58, which allows the entire frame 16 to then be lowered pivotally into the stowed position shown in FIG. 4.

When the frame 16 is in its stowed position, it can be lifted into its operative position simply by momentarily lifting the lever 72, which urges the locking pin 56 out of engagement with the recess 59, and then lifting the frame 16 out until it protrudes horizontally. At this point the locking pin 56, which rides within the slot 30, snaps into the recess 58 while the locking pin 60 snaps into the recess 62 in the support member 37 to hold the frame 16 in its operative position.

The apparatus 10 of the present invention thus forms a cargo carrying device which can be quickly and easily moved from its stowed to its operative position. Just as importantly, the apparatus 10 still allows a majority of the cargo space within the bed of a pickup truck to be used to transport larger items of cargo even when the apparatus 10 is in its operative position. The apparatus 10 further does not require modifications to the internal walls of the bed of a pickup truck before the apparatus can be installed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A cargo restraining device for use within a cargo carrying area of a motor vehicle, said cargo restraining device comprising:
    a support frame having at least one opening;
    a pivot assembly for pivotally supporting said support frame along an interior wall portion of said cargo carrying area;
    a locking mechanism operably associated with said pivot assembly for locking said support frame in a position extending away from said interior wall portion, and for enabling said support frame to be collapsed to a position disposed generally parallel to said interior wall portion when said cargo restraining device is not in use, said locking mechanism operating to engagingly support said support frame at both longitudinal ends thereof;
    at least one cargo supporting element associated with said opening for supporting cargo items therein; and
    an actuator member for actuating said locking mechanism such that both of said longitudinal ends of said support frame are simultaneously released from locked positions by movement of said actuator member.

2. The cargo restraining device of claim 1, wherein said cargo supporting element comprises a net.

3. The cargo restraining device of claim 1, further comprising an independent support member adapted to be fixedly secured to a portion of said cargo carrying area of said vehicle for engaging with said locking mechanism to assist in supporting said frame in said position extending from said interior wall portion.

4. The cargo restraining device of claim 3, wherein said locking mechanism comprises a first locking pin supported at a first longitudinal end of said frame and adapted to releasably engage said independent support member;
    a first cable coupled to said first locking pin; and
    said actuator member comprising a user actuatable member coupled to said first cable for causing said first cable to actuate said first locking pin to enable said frame to be released from said position extending away from said interior wall portion.

5. The cargo restraining device of claim 4, wherein:
    said locking mechanism further includes a second locking pin disposed at a second longitudinal end thereof;
    said locking mechanism further comprises a locking arm at said second longitudinal end pivotally mounted relative to said frame at said second longitudinal end and having first and second recesses;
    said first recess being engageable with said second locking pin to assist in holding said frame in said position extending away from said interior wall portion;
    said second recess being engageable with said second locking pin to hold said frame in said collapsed position; and
    a second cable coupled to said locking arm for moving said locking arm out of engagement with said second locking pin to permit movement of said frame.

6. The cargo restraining device of claim 5, wherein said actuating member is coupled to said first and second cables to simultaneously move said first locking pin and said locking arm.

7. A cargo restraining device for use within a cargo carrying area of a motor vehicle, said cargo restraining device comprising:
    a support frame having first and second longitudinal ends and having a plurality of openings;
    a plurality of flexible cargo supporting elements secured to said openings to define distinct cargo containing areas;
    a pivot assembly for pivotally supporting said support frame at one of said longitudinal ends of said support frame;
    a locking mechanism operably associated with said pivot assembly for locking said frame in said operative position, wherein said frame extends outwardly from an interior wall portion of said cargo carrying area, and a collapsed position wherein said frame is disposed generally parallel to said interior wall portion, said locking mechanism operating to engagingly lock said support frame relative to said cargo carrying area at each of said longitudinal ends; and
    a user engageable actuating member operably associated with said locking mechanism for allowing a user to unlock said locking mechanism to permit movement of said frame between said operative and said collapsed positions, said locking mechanism operating to substantially simultaneously release both of said longitudinal ends of said support frame when said actuating member is engaged by said user.

8. The cargo restraining device of claim 7, further comprising an independent support member fixedly secured to a wall portion of said cargo carrying area for engaging with said locking mechanism when said frame is extended into said operative position.

9. The cargo restraining device of claim 7, wherein said locking mechanism comprises:
  a pivot arm pivotally secured to a portion of said frame, said pivot arm having a first recess;
  a cable secured to said pivot arm to cause said pivot arm to move pivotally when said cable is moved, said cable further being secured to said actuating member;
  wherein said pivot assembly includes a locking pin for engaging with said first recess in said pivot arm to hold said frame in said operative position; and
  wherein said pivot arm is moveable out of engagement with said first recess by movement of said actuating member, to thereby permit said frame to be moved between said operative and collapsed positions.

10. The cargo restraining device of claim 7, wherein said locking mechanism comprises first and second cables each coupled to said actuating member; and
  at least one locking pin coupled to said first cable adjacent a first longitudinal end of said frame;
  a locking arm being coupled to said second cable at a second longitudinal end of said frame; and
  wherein said locking pin and said locking arm are moveable generally simultaneously when said cables are retracted by movement of said actuating member to move said locking arm and said one locking pin into unlatched positions, thereby permitting said frame to be moved pivotally into said collapsed position.

11. The cargo restraining device of claim 10, wherein said first and second cables each comprise bowden cables.

12. The cargo restraining device of claim. 7, wherein said frame is comprised of a single piece of molded plastic.

13. The cargo restraining device of claim 9, wherein said pivot arm comprises a second recess for engaging with said locking pin when said frame is moved into said collapsed position to thereby hold said frame in said collapsed position.

14. A cargo restraining device for use within a cargo carrying area of a motor vehicle, said cargo restraining device comprising:
  a support frame having a plurality of openings, said frame being moveable pivotally between an operative position extending generally horizontally from an interior wall portion of said cargo carrying area, and a collapsed position wherein said frame is disposed generally parallel to said interior wall portion;
  a plurality of flexible cargo supporting elements secured to said openings to define distinct cargo containing areas;
  a pivot assembly for pivotably supporting said support frame at a first longitudinal end of said support frame;
  a locking mechanism operably associated with said pivot assembly for locking said frame in said operative position in which said frame extends outwardly from an interior wall portion of said cargo carrying area, and a collapsed position in which said frame is disposed generally parallel to said interior wall portion;
  said locking mechanism including a pair of cables, a first one of said cables being operatively associated with a first locking member disposed at a first longitudinal end of said frame, and a second one of said cables being operatively coupled to a second locking member at a second end of said frame; and
  a user engageable actuating member disposed on said frame and being operably associated with said cables for allowing a user to move said cables generally simultaneously to unlock said locking members to permit movement of said frame between said operative and said collapsed positions.

* * * * *